UNITED STATES PATENT OFFICE.

HOMER T. YARYAN, OF TOLEDO, OHIO.

PROCESS OF MAKING FERTILIZER FROM TANK-WATER.

SPECIFICATION forming part of Letters Patent No. 443,559, dated December 30, 1890.

Application filed May 10, 1890. Serial No. 351,340. (No specimens.)

*To all whom it may concern:*

Be it known that I, HOMER T. YARYAN, a citizen of the United States, residing at Toledo, Lucas county, Ohio, have invented certain new and useful Improvements in the Treatment of Tank-Waters from Rendering Establishments in the Production of Fertilizers, of which the following is a specification.

My invention relates to the manufacture of fertilizer from tank-water, being the waste waters after the meaty parts containing fat have been digested under steam-pressure to release the grease, and has reference more particularly to the elimination from the waters of the salts that render the final product deliquescent. For several years past these tank-waters have been condensed into a thick liquid by the ordinary evaporators and then dried to a solid substance, which makes a valuable fertilizer, except for the fact that when ground and left to itself in a damp place it will take up moisture and will again set into a solid mass. The means now generally adopted to overcome this difficulty is to add some chemical to the condensed product which will modify this tendency to absorb moisture, or to mingle with the condensed product some absorbent—such as lime or bran—that will take up and hold the moisture; but such methods are objectionable on account of their expense and the amount of time and labor involved.

The object of my invention is to remedy the objections and difficulties here pointed out.

I find that the deliquescence of this fertilizer is due to the presence in the substance of phosphate of potash, chloride of sodium, and other alkaline salts diffused out of the animal matter, and that when these salts are removed there is no tendency to deliquesce. I find also that these salts may be entirely removed from the tank-waters either before or after evaporation by dialysis or by what is sometimes known as "osmosis."

In carrying out my process I first reduce the tank-water to about 25° of the Baumé scale with any of the known evaporators, but preferably by my apparatus described in United States Letters Patent Nos. 355,289 and 355,290, issued to me December 28, 1886. I then pass this condensed liquid through a dialyzer—such as, for instance, is used in the beet-sugar industry for removing potash salts from the molasses. The liquid comes from the dialyzer free from the salts which cause deliquescence, and it is only necessary to remove the final moisture with a suitable dryer to make a product which when ground will remain in a dry condition without absorbing sufficient moisture from the atmosphere to become sticky. This process may be modified by dialyzing the tank-waters as they come from the digesters and afterward evaporating and drying; but this is the obvious equivalent of the process just described. As the removal of the salts by the dialyzer from such a weak liquid is slow and imperfect, I prefer the other method.

I do not in my present invention confine myself to any particular form of apparatus for evaporating the tank-water, nor to any particular form of dialyzer, as any of those in common use may be adopted.

What I claim as my invention, and desire to secure by Letters Patent, is—

The process of producing fertilizer from tank-waters, which consists in first evaporating the liquid to the desired density, then passing the product through a dialyzer, by which such salts as produce deliquescence are removed, and then evaporating to a dry product, substantially as and for the purpose specified.

HOMER T. YARYAN.

In presence of—
ISAAC N. HUNTSBERGER,
P. P. POPE.